(12) United States Patent
Michenfelder et al.

(10) Patent No.: US 7,236,249 B1
(45) Date of Patent: Jun. 26, 2007

(54) RAIN SENSOR

(75) Inventors: Gebhard Michenfelder, Lichtenau (DE); Guenther Riehl, Buehlertal (DE); Manfred Burkart, Iffezheim (DE); Klaus Roth, Mondeville (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,063

(22) PCT Filed: Jan. 8, 1999

(86) PCT No.: PCT/DE99/00020

§ 371 (c)(1),
(2), (4) Date: Jan. 1, 2004

(87) PCT Pub. No.: WO99/52750

PCT Pub. Date: Oct. 21, 1999

(30) Foreign Application Priority Data

| Apr. 8, 1998 | (DE) | 198 15 749 |
| Sep. 15, 1998 | (DE) | 198 42 077 |
| Oct. 12, 1998 | (DE) | 198 46 968 |

(51) Int. Cl.
*G01N 21/55* (2006.01)

(52) U.S. Cl. ................................. 356/445

(58) Field of Classification Search ............... 356/445, 356/239.1, 239.2, 239.7, 239.8, 237.1–237.3, 356/338; 250/345.8, 574, 577, 227.25, 239, 250/216, 222.1, 222.2; 318/444, 480, 483, 318/487

See application file for complete search history.

(56) References Cited

U.S. PATENT DOCUMENTS

| 4,355,271 | A | | 10/1982 | Noack |
| 4,701,613 | A | | 10/1987 | Watanabe et al. ............ 250/227 |
| 4,871,917 | A | * | 10/1989 | O'Farrell et al. ............ 250/341 |
| 4,874,242 | A | | 10/1989 | Bezard et al. ............... 356/341 |
| 4,960,996 | A | * | 10/1990 | Hochstein .................... 250/349 |
| 4,973,844 | A | * | 11/1990 | O'Farrell et al. ............ 250/341 |
| 5,203,207 | A | * | 4/1993 | Sugiyama ................. 73/170.17 |
| 5,225,669 | A | * | 7/1993 | Hasch et al. ................. 250/214 |
| 5,262,640 | A | * | 11/1993 | Purvis et al. ........... 250/227.25 |
| 5,313,072 | A | | 5/1994 | Vachss |
| 5,414,257 | A | * | 5/1995 | Stanton .................. 250/227.25 |
| 5,498,866 | A | * | 3/1996 | Bendicks et al. ....... 250/227.25 |
| 5,543,923 | A | * | 8/1996 | Levers et al. ................ 356/445 |
| 5,560,245 | A | * | 10/1996 | Zettler et al. ............. 73/335.01 |

(Continued)

FOREIGN PATENT DOCUMENTS

DE 38 23 300 8/1989

(Continued)

*Primary Examiner*—Michael P. Stafira
(74) *Attorney, Agent, or Firm*—Kenyon & Kenyon LLP

(57) ABSTRACT

A rain sensor, for motor vehicles in particular, having one measuring distance with at least one transmitter and at least one receiver for electromagnetic waves (light waves), a windshield being arranged in the measuring distance, and the measuring distance influencing the wave propagation between the at least one transmitter and the at least one receiver in such a way that when a coating forms on the windshield, in particular as the result of wetting by precipitation, an output signal sensed by the receiver is changed. It is provided that the optical and electronic components of the rain sensor are mounted in a housing, a light conducting element forming a cover of the housing.

45 Claims, 3 Drawing Sheets

U.S. PATENT DOCUMENTS

| | | | |
|---|---|---|---|
| 5,572,017 A | | 11/1996 | Veltum et al. |
| 5,661,303 A | * | 8/1997 | Teder ........................ 250/341.8 |
| 5,703,568 A | | 12/1997 | Hegyi ........................ 340/602 |
| 5,898,183 A | | 4/1999 | Teder |
| 6,018,165 A | * | 1/2000 | Kerkmann et al. .......... 250/574 |
| 6,052,196 A | * | 4/2000 | Pientka et al. ............... 356/445 |
| 6,097,167 A | * | 8/2000 | Tanaka et al. ............... 318/483 |
| 6,118,383 A | | 9/2000 | Hegyi |
| 6,191,531 B1 | * | 2/2001 | Reime ........................ 315/82 |
| 6,376,824 B1 | * | 4/2002 | Michenfelder et al. . 250/214 R |

FOREIGN PATENT DOCUMENTS

| | | |
|---|---|---|
| DE | 43 00 741 | 7/1994 |
| DE | 432 9609 | 2/1995 |
| DE | 197 04 818 | 8/1997 |
| EP | 0 009 414 | 4/1984 |
| EP | 0 694 456 | 1/1996 |
| EP | 981 470 | 4/2004 |
| FR | 2 722 291 | 1/1996 |
| WO | WO 99/47396 | 9/1999 |

* cited by examiner

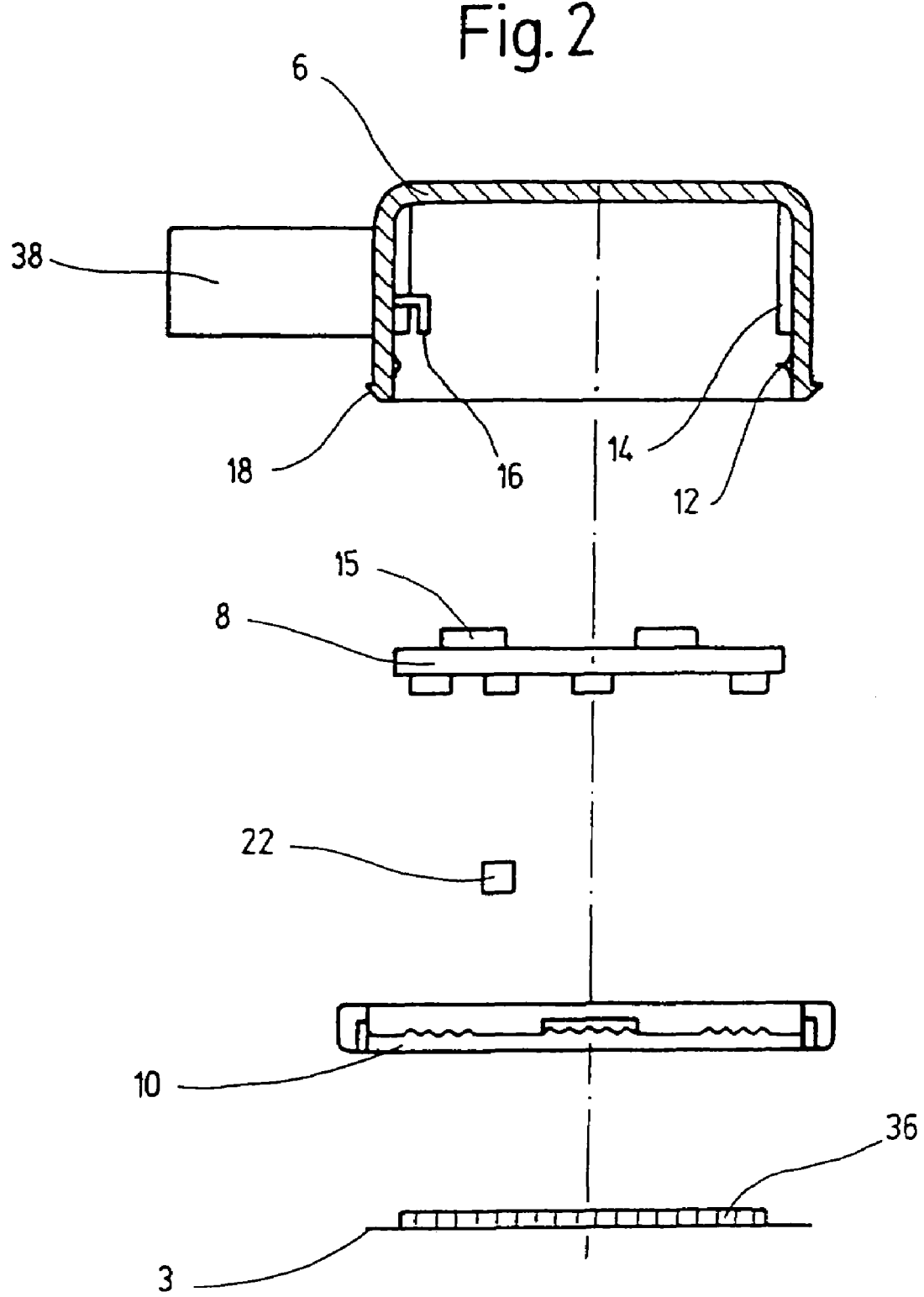

RAIN SENSOR

FIELD OF THE INVENTION

The present invention relates to a rain sensor.

BACKGROUND INFORMATION

Windshield wiper mechanisms for windshields of motor vehicles are known, the windshield wiper being controlled not only via a conventional steering column lever but also additionally via an optical rain sensor. The optical rain sensor normally includes a light source, the electromagnetic radiation of which is reflected in different ways by the windshield as a function of the moisture coating on the windshield. The reflected component is detected using a photoelectric cell so that an output signal of the rain sensor corresponding to the moisture coating can be supplied. These output signals can be analyzed and used to control the windshield wipers in such a way that both the switching on as well as the wiper speed are varied as a function of a measured quantity of rain.

Known rain sensors are customarily mounted on the inside of the windshield, preferably behind an interior rear-view mirror. Cemented metal feet, for example, are used for mounting. Also known are mountings using an additional frame which is previously joined to the windshield and the rain sensor housing is pressed into it later.

SUMMARY OF THE INVENTION

The rain sensor according to the present invention has in particular the advantage that only three single parts are required for its construction. The rain sensor is made up of a housing from which the electrical conductors for the connection to a downstream analysis unit are guided, a printed circuit board as well as a light conducting element which preferably already has all the optical lens structures. As a result, a cost-effective, very compact and easily mountable rain sensor is provided. The rain sensor can be easily mounted in particular via a transparent film which is preferably self-adhesive on both sides without having an adverse effect on its optical characteristics. Moreover, the rain sensor can be manufactured with few assembly steps so that it can be produced cost-effectively in mass production.

The mounting of all required electronic and optoelectronic components on a common printed circuit board, preferably mounted using SMD (surface mounted device) technology, makes it possible to implement very compact sensors which in addition can be mounted in the vehicle without difficulty. Consequently, a rain sensor of this type can be designed to be significantly more compact than known rain sensors and like them, it can be mounted, for example, behind an interior rear-view mirror on the inside of the windshield.

In a preferred embodiment of the present invention, the light conducting element simultaneously forms the cover of the sensor housing and in this way forms a complete electronic housing with it. The connection can be secured in an advantageous manner by clipping in place. A detachable protective film on an exterior adhesive side of the transparent adhesive film simultaneously protects the light conducting element against mechanical damage during transport. The very compact structure makes it possible for automotive manufacturers as customers of such rain sensors to perform simple and fast and consequently very cost-effective installation, which in addition can be automated without difficulty.

An output signal of the rain sensor according to the present invention can be advantageously used to control a windshield wiper mechanism and/or a vehicle lighting system. Thus, for example, it can be practical to switch on additional front fog lamps automatically with heavy rain or fog.

In a preferred embodiment of the present invention, a brightness sensor for ambient light may also be integrated in addition to the rain sensor, the brightness sensor delivering a signal to a large extent influenced by daylight and accordingly having a relatively wide conical aperture that is directed upward for incident light. It is a further advantage if the brightness sensor is sensitive to ultraviolet light components such as are present in sunlight but not in artificial light. In this manner, it is possible to avoid a false tripping by intense artificial light, for example, during travel through a tunnel.

The incident light can be focused in an advantageous manner by the light conducting element which acts simultaneously as a base plate for the sensor housing. Such a light conducting element may, for example, be produced from a plastic such as PMMA (polymethyl methacrylate) by injection molding, it being possible to incorporate optical structures such as convergent lenses in the molding process in a simple manner. If infrared light is used for the rain sensor function, it is advantageous to produce the light conducting element from black PMMA and to provide merely the light passage for the ambient light sensor from clear plastic. This can be implemented, for example, by processing using a two-color injection method or by combining, for example, by gluing or fusing, two single-color plastic parts.

BRIEF DESCRIPTION OF THE DRAWINGS

FIG. 1b shows a diagrammatic plan view of the rain sensor of FIG. 1a.

FIG. 2 shows a diagrammatic section of the rain sensor according to the present invention in an exploded view.

DETAILED DESCRIPTION

Figure 1A:
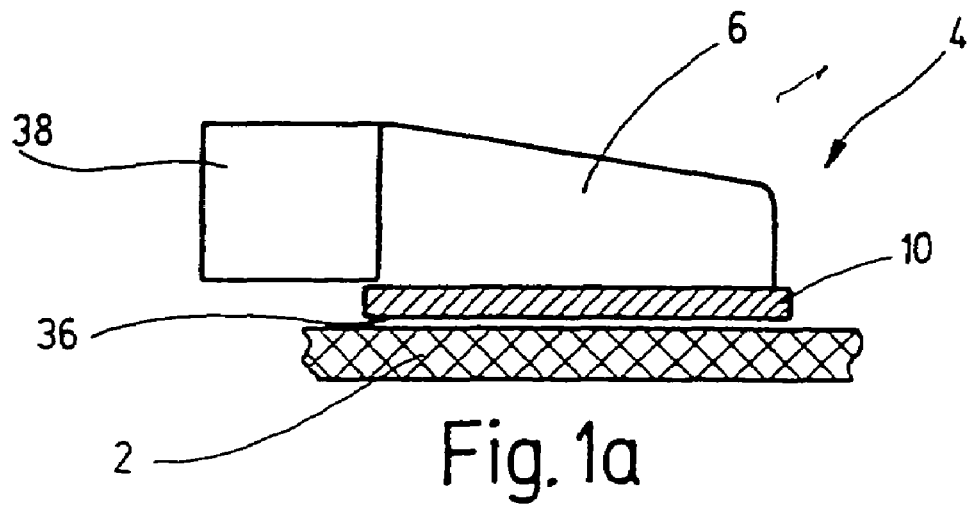
FIG. 1a shows a diagrammatic side view of a rain sensor according to the present invention.

FIG. 1a shows a rain sensor 4 according to the present invention in a diagrammatic side view, it being possible to fasten the rain sensor to the inside of a windshield 2 of a motor vehicle. Rain sensor 4 can be mounted behind windshield 2 by cementing, for example, at the level of an interior rear view mirror which is not shown here. Positioning behind the rear view mirror results in no additional obstruction of vision for a driver. The electronic and optoelectronic components of rain sensor 4 are enclosed by a housing 6 which is non-transparent in the direction of the interior, i.e., the passenger compartment. The bottom of the housing, which forms a broad area of connection with windshield 2, represents a light conducting element 10 into which all the optical structures (lens structures, light conducting structures and the like) needed for function have been incorporated. This can be accomplished, for example, by the injection molding of a suitable optically transparent plastic. For the mechanical and optical coupling of rain sensor 4 with the windshield, light conducting element 10 is joined to windshield 2 by a transparent adhesive film 36 which is self-adhesive on both sides.

Figure 1B:
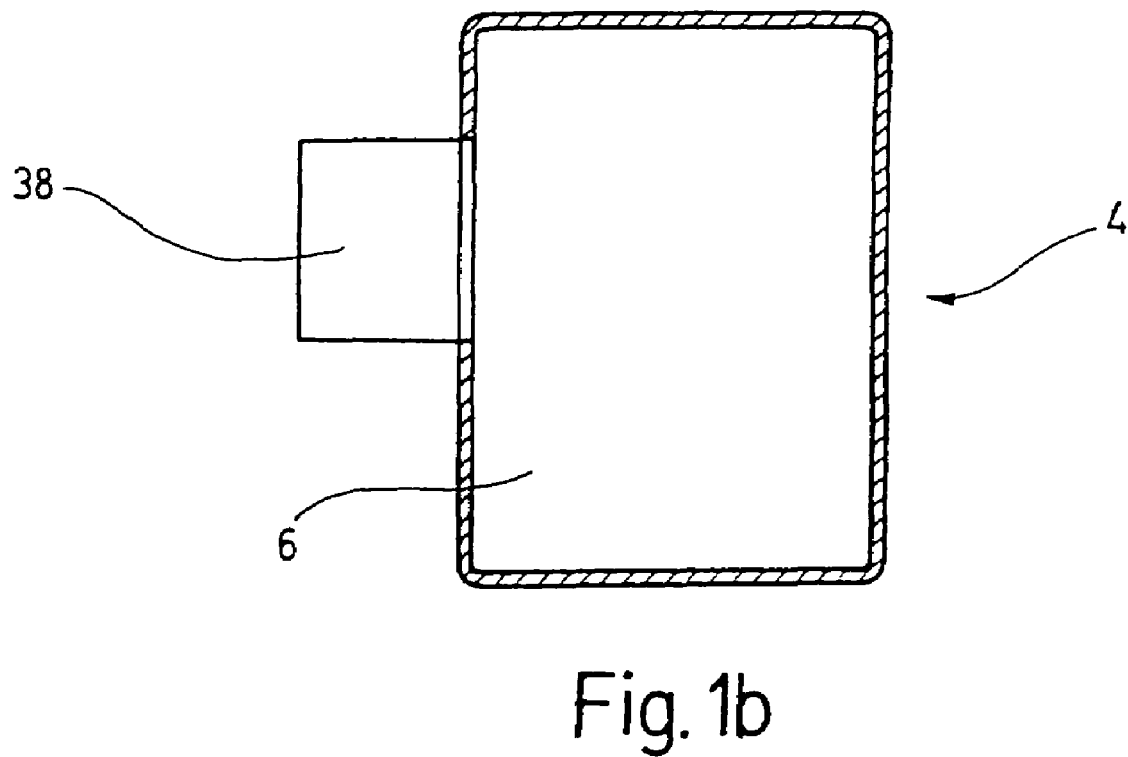
Figure 3:
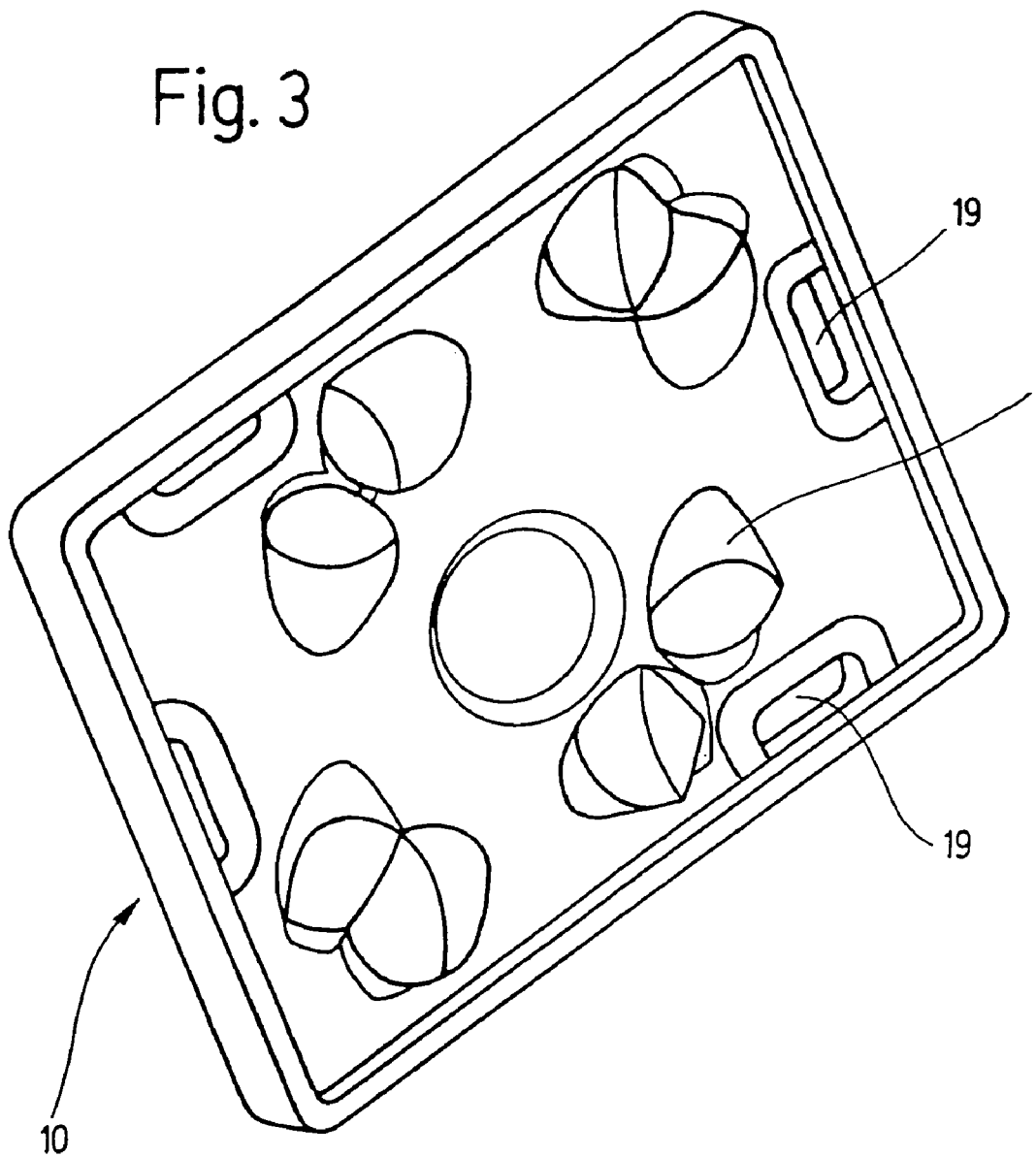
FIG. 3 shows a light conducting element in a perspective view.

FIG. 1b shows a diagrammatic plan view of rain sensor 4 according to FIG. 1a. It shows a connector 38 for the electrical connection to a downstream analysis unit which, however, is not shown here. It can variably activate a windshield wiper mechanism and/or a vehicle lighting system using signals delivered by rain sensor 4. Depending on the embodiment, connector 38 can have four or, for example, eight connector pins which penetrate into a mounted printed circuit board in housing 6 and are soldered or pressed there to produce an electrical connection.

FIG. 2 shows a diagrammatic section of rain sensor 4 according to the present invention in an exploded representation. A printed circuit board 8 can be inserted into pot-shaped housing 6, which is open at the bottom in this representation, against an offset 14 within housing 6, electronic and optoelectronic components being mounted on the circuit board using, for example, SMD (surface mounted device) technology. In order to positively secure printed circuit board 8 in housing 6, it is in contact with offset 14 in the housing after having been pressed over circumferential groove 12 during insertion. This holds printed circuit board 8 tightly in place and prevents it from falling out downwards. In addition, connector pins 16 which protrude into the interior of housing 6 can be seen, the connector pins being connected, for example, to the matching conductors of printed circuit board 8 by partial soldering or the like. A conductive compression joint is also possible.

A light emitting diode or LED 15 mounted on the top of printed circuit board 8 is required, for example, as the component which emits visible or infrared light in the form of a directional light beam. The light beam strikes windshield 2 at an acute angle and is normally completely reflected due to its refractive index at the windshield's outer boundary surface to the air and strikes a photodiode as a reflected component in nearly complete form, the photodiode also being mounted at a suitable position on the top of circuit board 8. If a droplet of water is now located at the site of the reflection of the light beam on the outside of windshield 2, the result is a changed refractive behavior at the outer boundary surface of the windshield to the air, as a result of which the light beam is not completely reflected at the boundary surface but rather a scattered component which escapes to the outside occurs. The signal of the reflected component which is attenuated in this way can be detected by the photodiode and analyzed quantitatively and thus registered as a haze of moisture or rain on the outside of windshield 2 of the motor vehicle.

The desired focusing of the light beam, i.e. the reflected component, can advantageously be achieved by a suitably shaped light conducting element 10 made up of a highly transparent and readily injection moldable plastic such as PMMA (polymethyl methacrylate) which simultaneously forms the base side of housing 6 and is joined to windshield 2 with a broad area of contact via a transparent adhesive film 36. With suitable molding, preferably using injection molding, light conducting element 10 can contain molded lens-shaped structures which provide the desired focusing and bundling of the light emitted by LED 15 as well as the light components detected by the photodiode.

In addition, an ambient light sensor 22 is arranged on printed circuit board 8, the light sensor detecting the brightness of the ambient light passing through windshield 2 of the motor vehicle and being able to generate a control signal dependent on the ambient light for an automatic light control or for a day/night changeover of the windshield wiper control in the motor vehicle. Advantageously, ambient light sensor 22 reacts preferably to specific UV light components which are present only in natural sunlight in order to thus prevent the vehicle headlights from being unintentionally switched off in brightly illuminated tunnels or underpasses with strong artificial light sources.

If infrared light is used for rain sensor 4, light conducting element 10 may be made of, for example, black PMMA and include only a small place for ambient light sensor 22 of clear material.

Also shown is transparent adhesive film 36 which produces a broad area of connection to windshield 2, an additional detachable protective film 3 on transparent adhesive film 36 being shown in FIG. 2. After this protective film 3 is removed, rain sensor 4 can be easily cemented to the desired position on windshield 2. Protective film 3 serves to protect light conducting element 10 and adhesive film 36 from mechanical damage during transport, installation or the like.

For clarification, FIG. 4 once more shows a perspective view of light conducting element 10 with the focusing structures (convergent lenses) incorporated in it by injection molding. Visible at each outside edge is a longitudinal groove 19, into which a matching stud 18 of housing 6 can be clipped (FIG. 2), thus making a tightly joined connection possible between lower open housing 6 and light conducting element 10 forming the lower housing cover.

What is claimed is:

1. A rain sensor arranged with respect to a measuring distance in which is arranged a windshield, comprising:
   a housing;
   a light conducting element for joining to the housing, wherein the light conducting element includes a first region having a first color and a second region having a second color that is different than the first color; and
   a plurality of optical and electronic components mounted in the housing and including:
      at least one transmitter for transmitting an electromagnetic wave, and
      at least one receiver for receiving the electromagnetic wave, the measuring distance influencing a wave propagation between the at least one transmitter and the at least one receiver such that when a coating forms on the windshield, an output signal sensed by the at least one receiver is changed.

2. The rain sensor according to claim 1, wherein the rain sensor is used in a motor vehicle.

3. The rain sensor according to claim 1, wherein the coating is a result of wetting by precipitation.

4. The rain sensor according to claim 1, wherein:
   the light conducting element forms a base plate of the housing and includes a broad area of connection with the windshield.

5. The rain sensor according to claim 4, further comprising:
   a common printed circuit board on which is mounted the plurality of optical and electronic components in accordance with SMD technology.

6. The rain sensor according to claim 5, further comprising:
   an integrated connector for an electrical connection to a downstream analysis unit, wherein:
   the housing corresponds to a rectangular-shaped sensor housing.

7. The rain sensor according to claim 6, further comprising:
   contact pins through which the common printed circuit board is connected to the integrated connector.

8. The rain sensor according to claim 1, wherein:
the rain sensor is cemented to an inside of the windshield.

9. The rain sensor according to claim 8, further comprising:
a transparent film that is self-adhesive on each side thereof and corresponds to a connection between the windshield and the light conducting element.

10. The rain sensor according to claim 1, wherein:
the output signal is provided to a downstream analysis circuit and includes information with respect to an instantaneous degree of wetting of the windshield.

11. The rain sensor according to claim 10, wherein:
at least one of a windshield wiper mechanism and a vehicle lighting system is activated as a function of the output signal.

12. The rain sensor according to claim 1, wherein:
the at least one transmitter includes at least one LED.

13. The rain sensor according to claim 12, wherein:
a first one of the at least one receiver that detects an optical signal emitted by the at least one LED includes a photodiode.

14. The rain sensor according to claim 1, wherein:
the plurality of optical and electronic components includes at least one ambient light sensor.

15. The rain sensor according to claim 14, wherein:
the at least one ambient light sensor includes an aperture angle of approximately 40° inclined upward with an aperture direction in a direction of travel.

16. The rain sensor according to claim 15, wherein:
the at least one ambient light sensor is sensitive to an ultraviolet light.

17. The rain sensor according to claim 16, wherein:
the ultraviolet light corresponds to sunlight.

18. The rain sensor according to claim 1, wherein:
the first region includes a black plastic.

19. The rain sensor according to claim 1, wherein:
the second region includes a transparent plastic.

20. The rain sensor according to claim 1, wherein:
the first region and the second region are formed according to a two-color injection molding process.

21. The rain sensor according claim 1, wherein:
the first region and the second region correspond to two single-color plastics, and
the light conducting element is formed by combining the two single-color plastics.

22. The rain sensor according to claim 1, wherein:
the light conducting element includes integrated lens structures for light bundling.

23. The rain sensor according to claim 14, wherein:
the at least one ambient light sensor is sensitive to visible light.

24. The rain sensor according to claim 1, wherein:
the light conducting element forms a cover of the housing.

25. A rain sensor arranged with respect to a measuring distance in which is arranged a windshield, comprising:
a housing;
a light conducting element for joining to the housing; and
a plurality of optical and electronic components mounted in the housing and including:
at least one transmitter for transmitting an electromagnetic wave,
at least one ambient light sensor that is sensitive to visible light, and
at least one receiver for receiving the electromagnetic wave, the measuring distance influencing a wave propagation between the at least one transmitter and the at least one receiver such that when a coating forms on the windshield, wherein:
an output signal sensed by the at least one receiver is changed the output signal is provided to a downstream analysis circuit and includes information with respect to an instantaneous degree of wetting of the windshield, and at least one of a windshield wiper mechanism and a vehicle lighting system is activated as a function of the output signal.

26. The rain sensor according to claim 25, wherein:
the rain sensor is used in a motor vehicle.

27. The rain sensor according to claim 25, wherein:
the coating is a result of wetting by precipitation.

28. The rain sensor according to claim 25, wherein:
the light conducting element forms a base plate of the housing and
includes a broad area of connection with the windshield.

29. The rain sensor according to claim 28, further comprising:
a common printed circuit board on which is mounted the plurality of optical and electronic components in accordance with SMD technology.

30. The rain sensor according to claim 29, further comprising:
an integrated connector for an electrical connection to a downstream analysis unit, wherein:
the housing corresponds to a rectangular-shaped sensor housing.

31. The rain sensor according to claim 30, further comprising:
contact pins through which the common printed circuit board is connected to the integrated connector.

32. The rain sensor according to claim 25, wherein:
the rain sensor is cemented to an inside of the windshield.

33. The rain sensor according to claim 32, further comprising:
a transparent film that is self-adhesive on each side thereof and corresponds to a connection between the windshield and the light conducting element.

34. The rain sensor according to claim 25, wherein:
the at least one transmitter includes at least one LED.

35. The rain sensor according to claim 34, wherein:
a first one of the at least one receiver that detects an optical signal emitted by the at least one LED includes a photodiode.

36. The rain sensor according to claim 25, wherein:
the at least one ambient light sensor includes an aperture angle of approximately 40° inclined upward with an aperture direction in a direction of travel.

37. The rain sensor according to claim 25, wherein:
the at least one ambient light sensor is sensitive to an ultraviolet light.

38. The rain sensor according to claim 37, wherein:
the ultraviolet light corresponds to sunlight.

39. The rain sensor according to claim 25, wherein:
where an infrared light is used, the light conducting element is formed of a black plastic.

40. The rain sensor according to claim 25, wherein:
the light conducting element includes optical areas formed from transparent plastic for the at least one receiver.

41. The rain sensor according to claim 25, wherein:
the light conducting element includes a plastic part formed according to a two-color injection molding process.

42. The rain sensor according claim 25, wherein:
the light conducting element is formed by combining two single-color plastics.

43. The rain sensor according to claim 25, wherein:
the light conducting element includes integrated lens structures for light bundling.

44. The rain sensor according to claim 25, wherein:
the light conducting element forms a cover of the housing.

45. The rain sensor according to claim 1, wherein:
the first region includes a black plastic, and
the second region includes a transparent plastic.

* * * * *